Sept. 10, 1940.   G. T. SIMS   2,214,680
COMBINED SEPARATOR AND DRIER FOR THE TREATMENT OF COTTON
Filed June 13, 1939   4 Sheets-Sheet 3
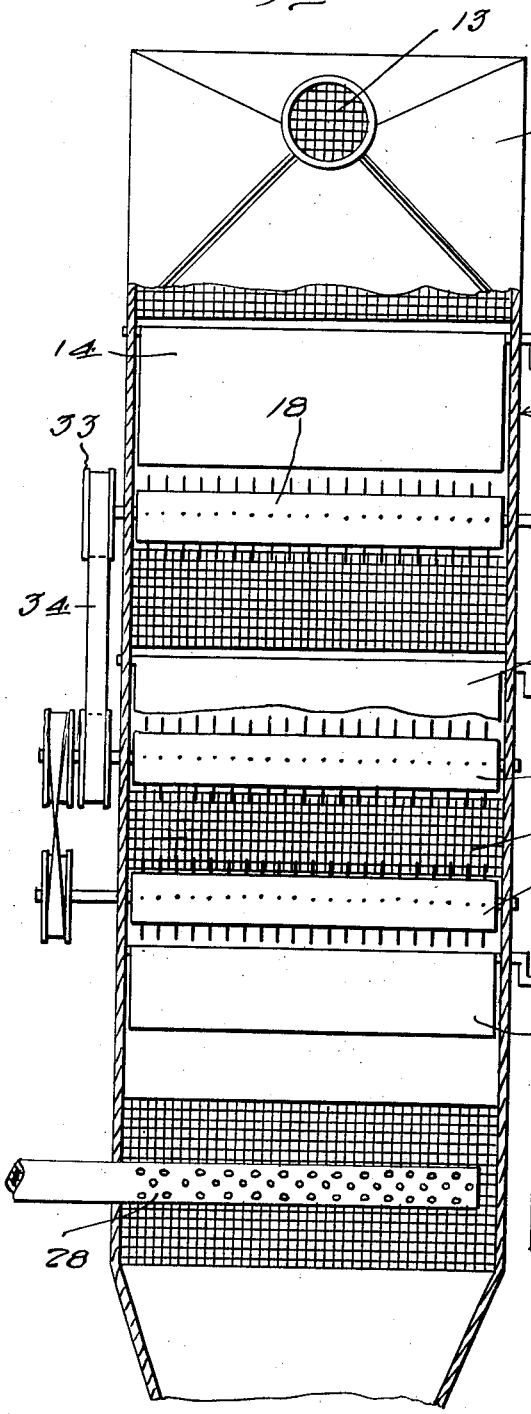
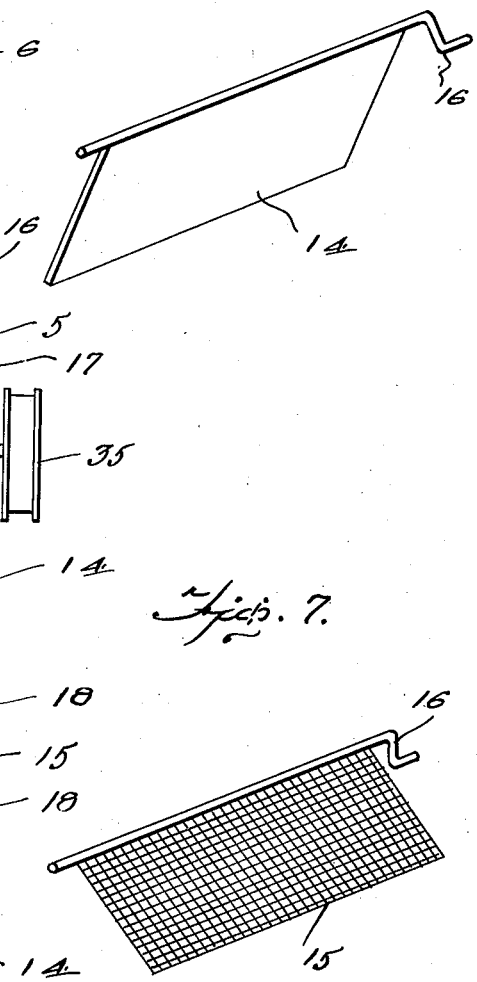
Inventor
George T. Sims
By Clarence A. O'Brien
and Hyman Berman
Attorneys

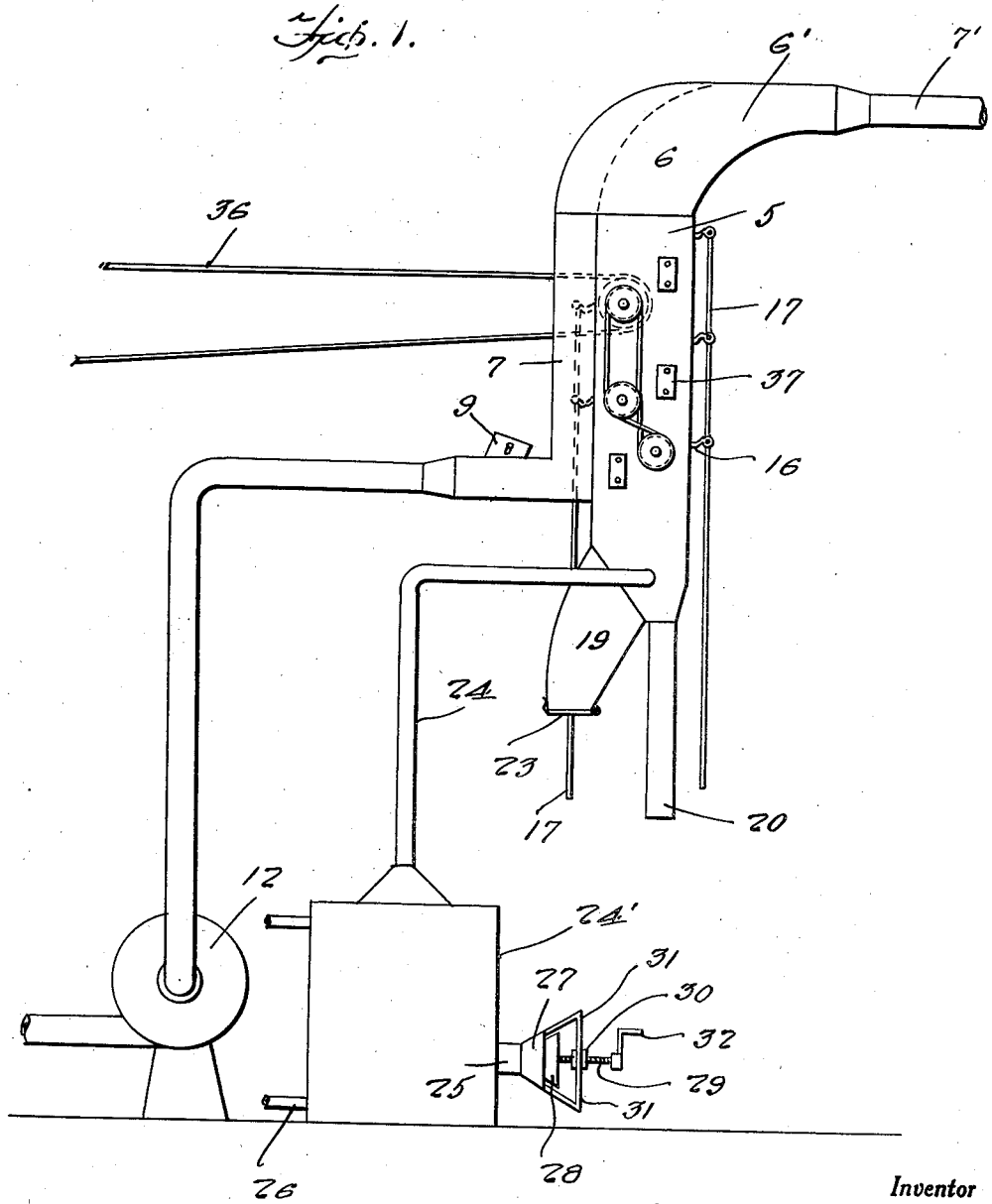

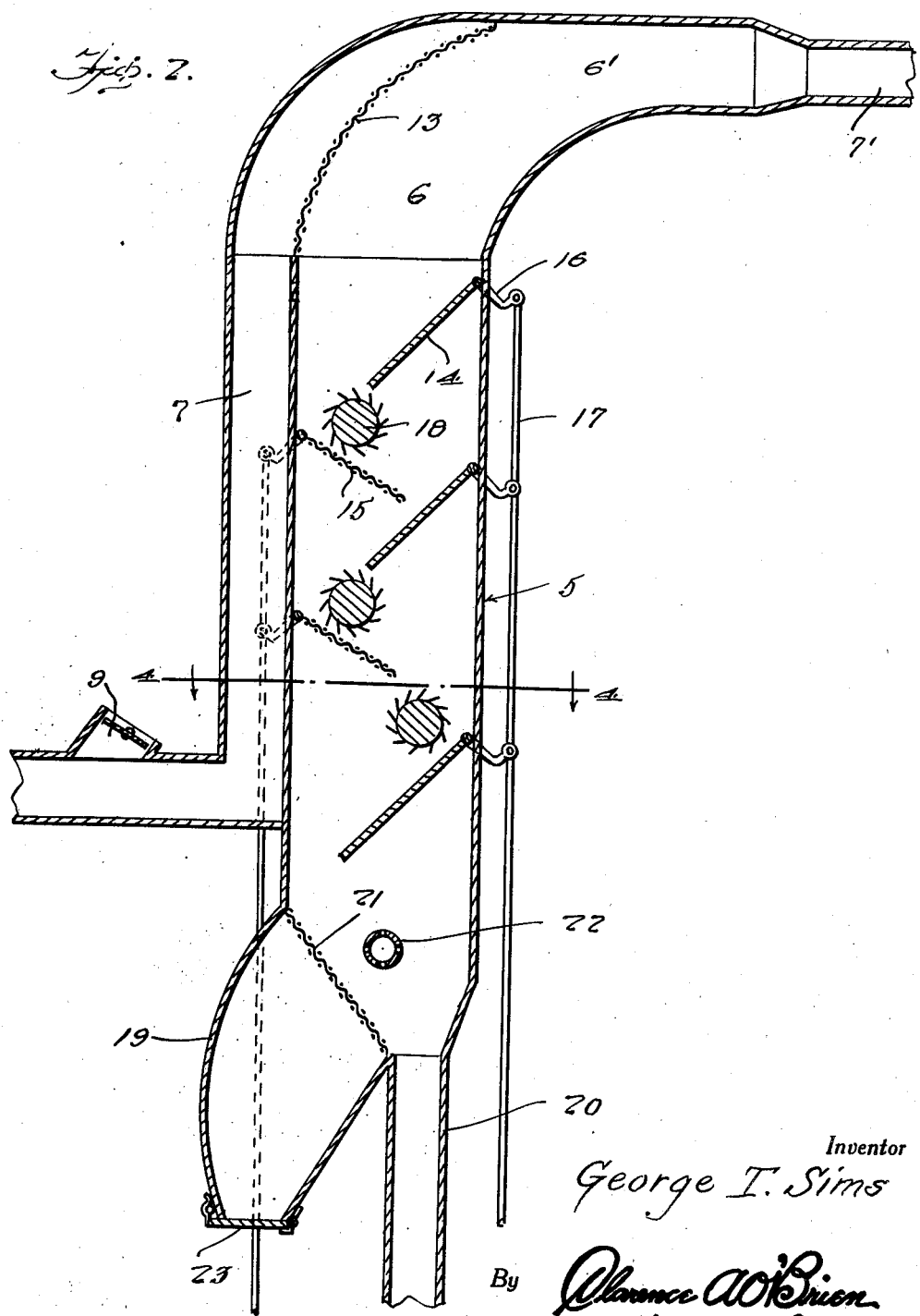

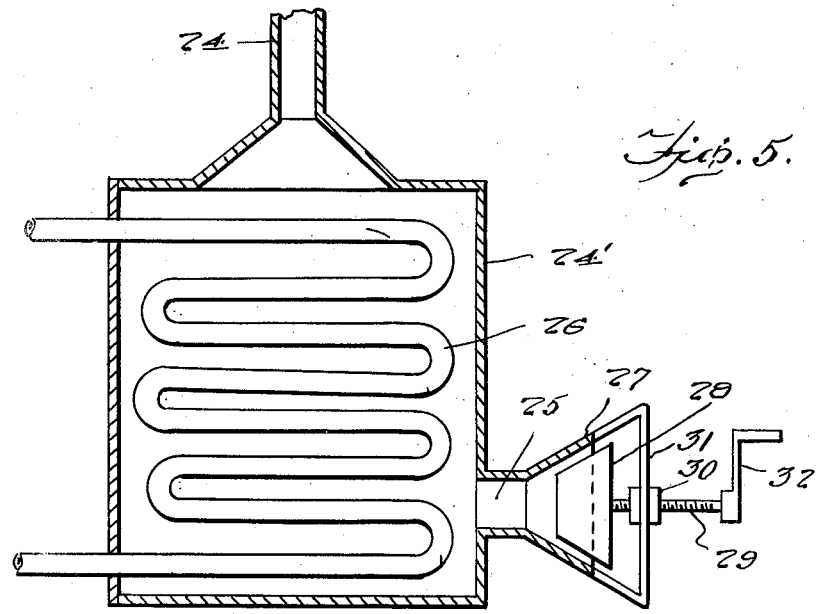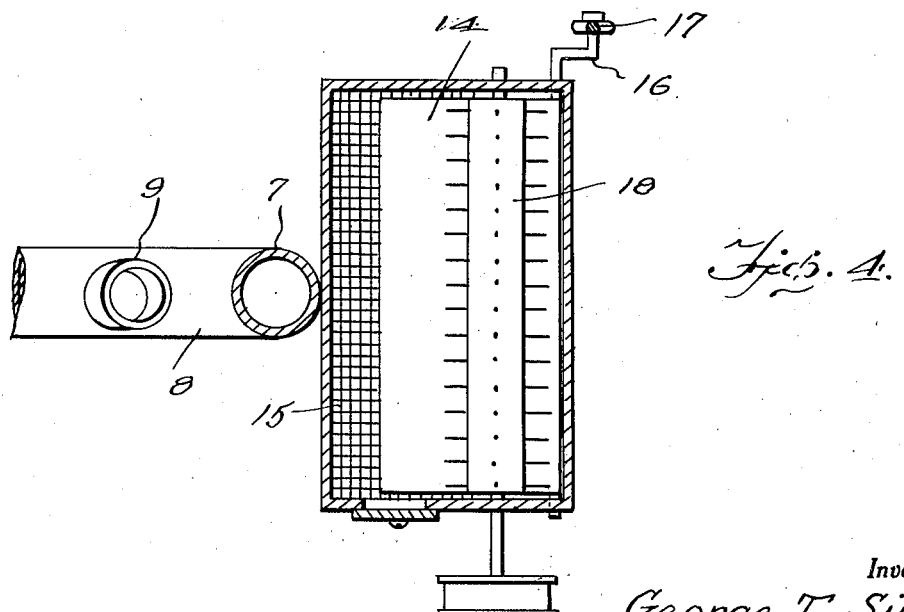

Patented Sept. 10, 1940

2,214,680

UNITED STATES PATENT OFFICE 2,214,680

COMBINED SEPARATOR AND DRIER FOR THE TREATMENT OF COTTON

George T. Sims, Columbus, Miss.

Application June 13, 1939, Serial No. 278,984

1 Claim. (Cl. 19—75)

This invention relates to a combined separator and drier, and has for the primary object the provision of a device of this character which may operate in conjunction with a conventional cotton gin for separating foreign matter from cotton and for drying the cotton prior to reaching the gin, so that the cotton will be in a much better condition for ginning permitting the ginning operation to be carried out more efficiently and quicker.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a combined drier and cleaner for the treatment of cotton and constructed in accordance with my invention.

Figure 2 is a fragmentary vertical sectional view illustrating the main casing of the device in which the cotton is separated from foreign matter and dried before being discharged therefrom to a conventional gin.

Figure 3 is a fragmentary end elevation, partly in section, illustrating the means of picking the cotton and separating foreign matter therefrom during the drying operation.

Figure 4 is a sectional view taken on the line 4—4 of Figure 2.

Figure 5 is a fragmentary vertical sectional view illustrating the air heating chamber.

Figure 6 is a perspective view illustrating one type of baffle used in the device.

Figure 7 is a perspective view illustrating another type of baffle used in the device.

Referring in detail to the drawings, the numeral 5 indicates an elongated vertically arranged casing having its upper end connected with a separator of a gin of a conventional construction (not shown) and includes a separator 6 having a neck 6', the free end of which terminates laterally of the casing 5 in a horizontal plane and in the form of a pipe 7' to receive by suction cotton from a wagon or like conveyance. The separator further includes a screen 13 for intercepting the incoming cotton and causing the cotton to gravitate into the casing 5 while the suction air passes into a conduit 7 forming a part of the gin construction and which is provided with a vent 9 controlled by a suitable damper. The suction fan is indicated by the character 12.

It is to be understood that the suction fan draws the cotton into the separator 6 where it passes by gravitation into the casing 5.

The cotton gravitating in the casing is intercepted by groups of pivotally mounted baffles 14 and 15. The baffles 14 of one group are arranged in superposed relation and at one side of the casing, while the baffles 15 are arranged in superposed relation at the opposite side of the casing from the baffles 14 and in staggered relation to the latter, so that the cotton passing downwardly over said baffles will be caused to gravitate in a zigzag path. The baffles 14 and 15 on their pivoted ends have connected thereto arms 16 extending exteriorly of the casing 5 and connected by pivots to operating rods 17. The operating rods permit the inclination of the baffles 14 and 15 to be varied.

Picker rollers 18 of the toothed type are journaled in the casing 5 and are arranged between the group of baffles so that the cotton passing from the baffles 14 must come in contact with the picker rollers before reaching the baffles 15. If desired, the baffles 14 may be constructed of solid material while the baffles 15 may be constructed of foraminous material or perforated material. As the cotton passes from the baffles in its downward path of movement, the picker rollers tear the cotton apart and fluff up the cotton so that hot air in the casing will reach all particles of the cotton and thoroughly dry the cotton and the cotton being separated as described will loosen therefrom foreign matter.

The lower portion of the casing 5 has formed thereon, a receiving hopper 19 and an outlet pipe 20 for the treated cotton. The outlet pipe may lead to a conveyor (not shown) of the cotton gin. The mouth of the hopper 19 is traversed by a separator screen 21 disposed at an inclination, slanting toward the mouth of the outlet pipe 20 so that the cotton on leaving the lowermost baffle will pass over the separator screen 21 allowing the foreign matter to enter the hopper 19 and the cleaned and treated cotton to pass from the casing 5 by way of the outlet pipe 20.

A heat discharge nozzle 22 is arranged in the casing 5 between the lowermost baffle and the hopper 19 and the outlet pipe 20. The nozzle 22 is adapted to discharge hot air to the lower portion of the casing for movement upwardly through the cotton as the latter is torn apart by the picker rollers so as to remove from the cotton moisture and dampness and further aid in the separation of foreign matter from the cotton. The upward movement of the heated air is brought about through the suction received from the suction pipe 7, besides the natural tendency for heated air to rise.

The lower portion of the hopper 19 has a trap door 23 so that foreign matter accumulating within the hopper may be removed whenever desired.

The nozzle 22 is connected to a hot air pipe 24 leading to a heat chamber 24' having an air inlet 25 and a heating coil 26. The heating coil is arranged within the path of movement of the air received from the air inlet 25 on its travel to the pipe 24. The heat chamber 24' may be of any desired construction and its air inlet includes a conical-shaped portion 27 providing a seat for a conical-shaped valve 28. The conical-shaped valve is carried by a feed stem 29 journaled in a feed nut 30 carried by the frame 31 mounted on the air inlet. A crank handle 32 is connected with the feed stem whereby the valve element 20 may be adjusted relative to the feed for controlling the amount of air entering the heat chamber.

It is to be understood while I have described a specific construction of valve and operating means therefor for controlling the air another type of valve may be employed if desired. The coil 26 of the heat chamber is adapted to be connected in any well known manner to the steam type heat source (not shown).

The shafts of the picker rollers 18 extend exteriorly of the casing and have pulleys 33 secured thereto and trained over said pulleys are endless belts 34, one of which is crossed to bring about rotation of certain of the picker rollers in opposite directions to the rotation of the other picker rollers. One of the shafts has a drive pulley 35 secured thereto over which is trained a drive belt 36. Power is delivered to the drive belt from any suitable power source or from the cotton gin. The casing 5 between the baffles is provided with cleanout plates 37 which, if desired, may be in the form of windows to permit viewing of the interior of the casing during the treatment of the cotton therein.

While I have shown and described the invention operating in conjunction with a particular type of separator of a gin it is to be understood that the invention can be successfully employed in conjunction with a separator of the rotatable type (not shown).

From the foregoing description taken in connection with the accompanying drawings it will be seen that the cotton entering the separator by the suction of the fan engages the screen 13 and falls into the casing 5 for gravitation therethrough. As the cotton gravitates from one baffle to another, the picker rollers act on the cotton to tear the same apart. During this operation heated air flows upwardly through the casing and removes from the cotton dampness, moisture or the like so that when the cotton leaves the casing by way of the outlet pipe 20 it is in the most highly efficient condition for ginning purposes. The foreign matter leaving the cotton within the casing 5 passes therefrom into the receiving hopper 19.

It is believed that the foregoing description, when taken in connection with the drawings, will fully set forth the construction and advantages of this invention to those skilled in the art to which such a device relates, so that further detailed description will not be required.

Having described the invention, I claim:

In a device of the character set forth comprising a vertically arranged casing adapted to receive cotton from a suction means, adjustable means in said casing to cause cotton passing therethrough by gravitation to travel in a zigzag path, means acting on said cotton while moving in said path to tear the fibres of the cotton apart, a hot air discharge nozzle located in the lower portion of the casing, a trash hopper connected to the casing below said nozzle, a cotton outlet pipe connected to the lower end of the casing below said nozzle, a pipe connected to said nozzle, a heat chamber connected to said last-named pipe and having a heating coil therein and an air inlet neck provided with a flared portion to form a seat, and a valve element operating in conjunction with said seat for the control of air into said heat chamber.

GEORGE T. SIMS.